Figure 1:
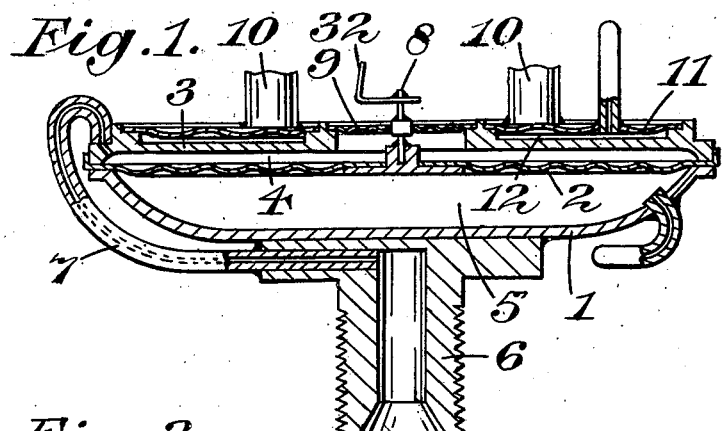

June 9, 1942.  F. MACK  2,285,777
PRESSURE GAUGE
Filed July 23, 1940  2 Sheets-Sheet 1

INVENTOR
FREDERICK MACK
BY
Young, Emery & Thompson
ATTYS.

June 9, 1942.   F. MACK   2,285,777
PRESSURE GAUGE
Filed July 23, 1940   2 Sheets-Sheet 2
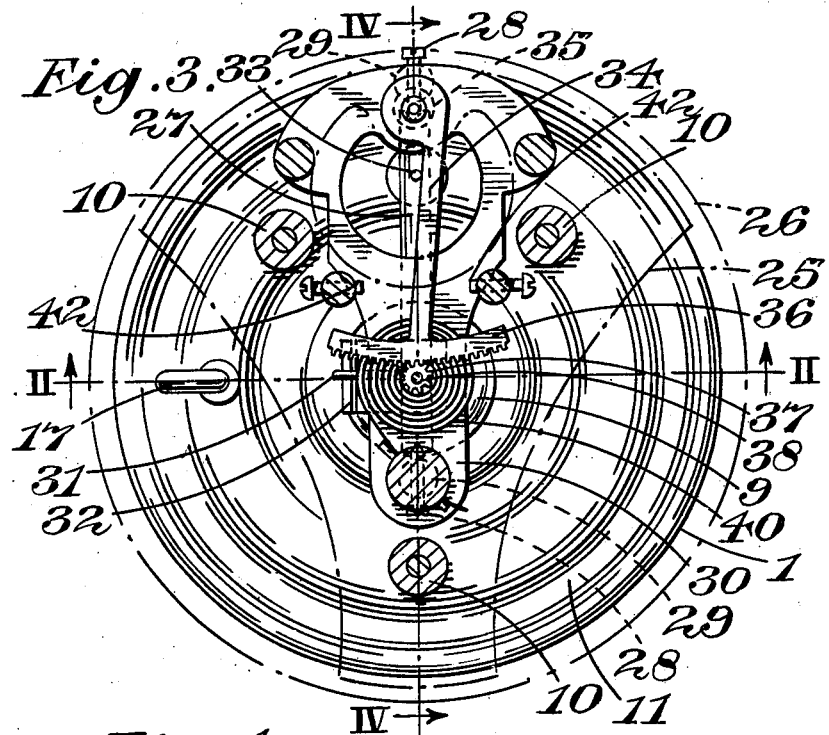
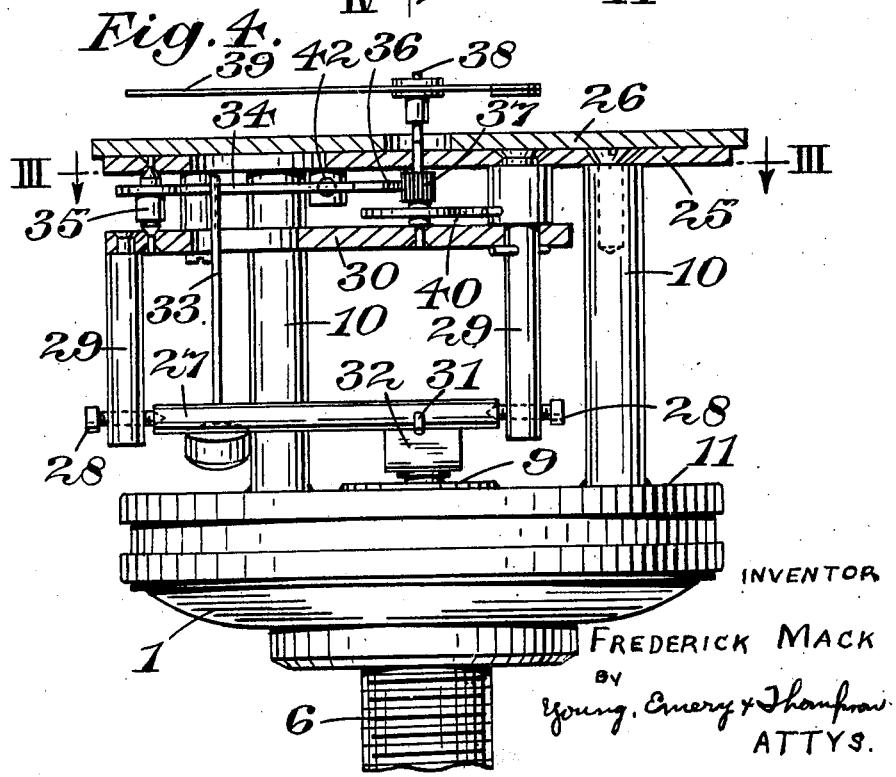
INVENTOR
FREDERICK MACK
BY
Young, Emery & Thompson
ATTYS.

Patented June 9, 1942

2,285,777

UNITED STATES PATENT OFFICE 2,285,777

PRESSURE GAUGE

Frederick Mack, London, England, assignor to K. D. G. Instruments, Limited, London, England, a British company Application July 23, 1940, Serial No. 347,063
In Great Britain February 16, 1940

8 Claims. (Cl. 73—110)

This invention relates to pressure gauges of the type comprising a flexible diaphragm which is arranged to have one side exposed to the source of pressure to be measured and the other side to a different pressure (usually a constant pressure), an instrument movement coupled to the diaphragm by a push rod or equivalent operating member, a dial or the equivalent, and associated parts.

The present invention is particularly (but not exclusively) concerned with pressure gauges of the kind known as "boost" gauges for use on aircraft equipped with supercharged engines and arranged to give an accurate indication of the boost pressure in spite of variations in atmospheric pressure due to changes in altitude of the aircraft.

The invention provides a pressure gauge comprising a fluid-pressure chamber, a flexible operating diaphragm dividing the chamber into two separate compartments one of which may be put into fluid-tight communication with the source of pressure to be measured and the other of which is hermetically sealed (and preferably exhausted of air), an instrument movement for indicating movements of the operating diaphragm and external to the fluid-pressure chamber, a mechanical coupling between the operating diaphragm and the instrument movement passing through an aperture in the wall of the fluid-pressure chamber to convey, by its movements, the movements of the operating diaphragm to the instrument movement, and a secondary flexible diaphragm attached to the mechanical coupling for movement therewith by flexing of the diaphragm and forming an airtight seal at the aperture aforesaid.

According to a feature of the invention means are provided for counteracting the effect on the accuracy of the gauge of changes in atmospheric pressure on the flexible sealing diaphragm through which the coupling between the diaphragm and the instrument movement extends. According to one arrangement this is effected by mounting the instrument movement on a further flexible diaphragm for example in the form of an annulus, exposed to the same changes in atmospheric pressure as is the flexible seal and so dimensioned and arranged that the pressure effects on the movement-carrying diaphragm and the flexible sealing diaphragm tend to counterbalance each other.

Figure 2:
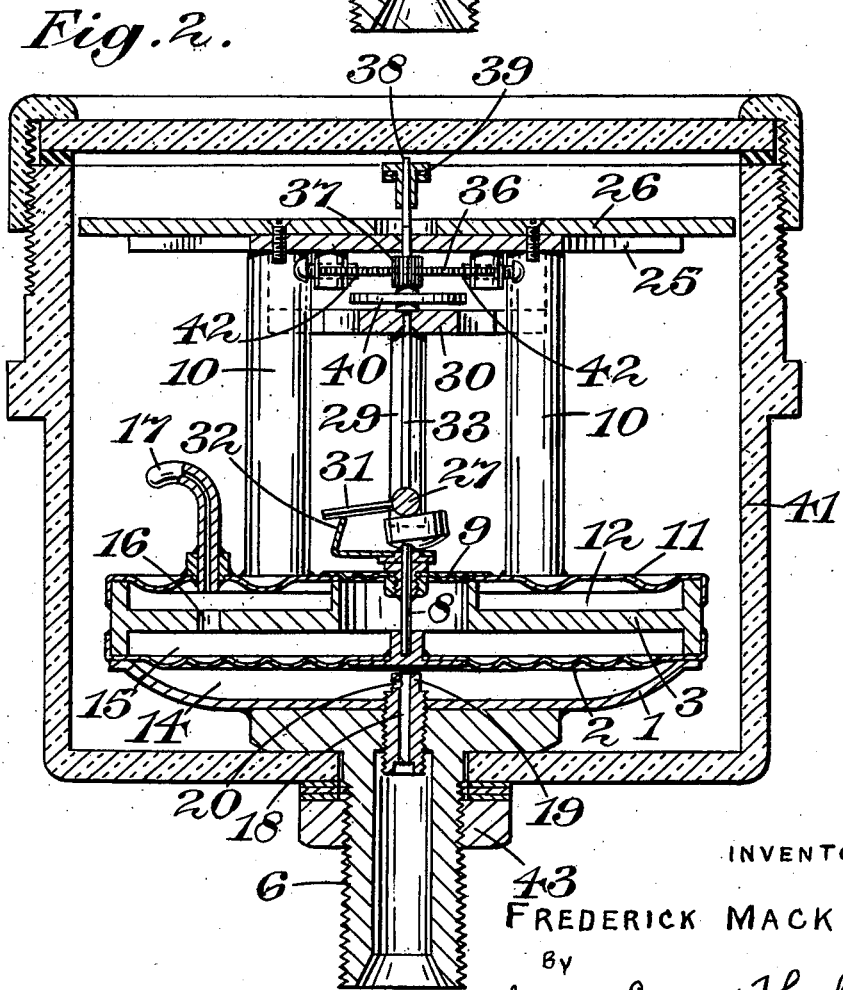

One example of a pressure gauge adapted to operate as a boost gauge and embodying the foregoing and other features of the invention and a modified form of this example will now be described with reference to the accompanying drawings in which:

Figure 1 is a section showing the fluid-pressure chamber and associated parts of the gauge, Figure 2 is a section taken on the line II—II in Figure 3 through a complete gauge incorporating a modified form of the chamber and parts shown in Figure 1, Figure 3 is a plan of the gauge shown in Figure 2 as viewed on the line III—III in Figure 4 and omitting the casing, and Figure 4 is an elevational view of the gauge mechanism partly in section on the line IV—IV in Figure 3.

Like references indicate like parts in the several figures of the drawings.

In the example shown in Figure 1 the fluid-pressure chamber is constituted by a dished back plate 1 having a flexible diaphragm 2—hereinafter referred to as the main diaphragm—marginally secured to it and extending across its concavity and a dished front plate 3 marginally secured to the back plate with the concavities of the two plates opposed to one another, the whole forming a capsule across the interior of which the diaphragm 2 extends and divides the chamber into two separate compartments 4, 5 adjacent to the front and back plates respectively and hereinafter referred to respectively as the front and back compartments. A screw-threaded nipple 6 is attached centrally to the back plate to extend outwardly at right-angles thereto and to form a means of securing the pressure chamber to the base of the instrument case as later described, the nipple also being arranged for connection by any convenient conduit to the intake manifold of the engine. The back compartment 5 is sealed and exhausted of air. The front compartment 4 is sealed to atmosphere but is put in communication with the source of pressure to be measured, i. e. in the intake manifold, by means of a pipe 7 external to the fluid-pressure chamber and extending between the side of the front compartment 4 and a lateral passage in the nipple 6 extending to its central duct. The centre of the main diaphragm 2 is coupled to the multiplying mechanism of the instrument movement (later described) by means of a push rod 8 which extends to the outside of the fluid-pressure chamber through a central aperture in the front plate 3. This aperture is closed by an airtight flexible seal in the form of a small circular diaphragm 9 sealed at its periphery around the margins of the aperture and formed with a central hole through which the push rod extends and at which the push rod is sealed and mechanically coupled, for example by soldering, to the small diaphragm.

The instrument movement which is described later is supported by three pillars 10 which are attached indirectly to the outside of the front plate. The indirect connection of the pillars to the plate comprises an annular diaphragm 11 superimposed on the outside of the front plate and sealed thereto around its inner and outer edges, there being a small gap between the opposed faces of the annular diaphragm and the front plate. The annular chamber 12 formed by this gap is sealed at a predetermined pressure and the pillars carrying the instrument movement are secured to the annular diaphragm which may be of comparatively stout material.

It will be appreciated that with the above arrangement the influence on the movement of the main diaphragm 2 brought about by variations in atmospheric pressure during changes in altitude of the aircraft is limited to the effect of the changes of pressure on the small diaphragm 9 at the central seal. By making this diaphragm very small in relation to the size of the main diaphragm the error due to altitude variations is brought within manageable proportions. It is then eradicated, or reduced to allowable limits, by means of the compensation provided by mounting the instrument movement on the annular diaphragm 11 secured to the front plate. It will be appreciated that the annular diaphragm is subjected to the same variations of atmospheric pressure as is the small disc diaphragm 9 at the central seal. The annular diaphragm is so dimensioned that the effect of pressure variations on it and on the central sealing diaphragm are complementary so that assuming a constant pressure in the induction pipe, any movement of the diaphragm push rod brought about by a change in atmospheric pressure on the central sealing diaphragm will be counteracted by a displacement of the pillars carrying the instrument movement, and there will be no change in the reading given by the instrument movement.

In the example shown in Figures 2 to 4 the arrangement described above is modified in that the back chamber 14 is connected to the source of pressure to be measured and the front chamber 15, which is exhausted and sealed, is in open communication, through a hole 16 in the front plate, with the annular chamber between the annular diaphragm 11 and the front plate 3. This modified arrangement of the gauge has the advantage that the front chamber 15 and the annular chamber 12 may be exhausted through a common tube 17 and only one sealing operation is required. The modified arrangement has the further advantage that the pressure variations being measured are not applied to the small sealing diaphragm 9.

In order to admit the pressure to be measured to the back compartment the nipple 6, in the modified construction shown in Figures 2 to 4, is put into direct communication with the back compartment 14 through an aperture 18 in the wall of that compartment and the external connection to the front compartment described above is omitted. The aperture, which is at the centre of the back plate, is of small diameter to provide a constriction preventing sudden large changes of pressure, due for example to a backfire of the engine, being applied to the main diaphragm. The constricted aperture is formed by a second nipple 19 screwed inside the nipple 6 and extending through the back plate into the back compartment to such an extent that it also serves as a stop limiting the movement of the main diaphragm towards the back plate. The nipple has a side passageway 20 leading into the back compartment so that contact between the end of the nipple and the diaphragm does not seal the connection to the back compartment.

Figures 2 to 4 also show the arrangement of instrument movement. The movement is, as already stated, carried on the pillars 10 which are themselves supported from the diaphragm 11. Attached to the upper ends of the pillars 10 is a support plate 25 which carries on its upper face a dial 26 and on its lower face the multiplying mechanism of the movement. The multiplying mechanism comprises a rod 27 pivotally supported at its ends by pointed screws 28 held in pillars 29 themselves supported by a plate 30 secured underneath the support plate 25. The rod 27 carries two arms of which one, shown at 31, is engaged by a cranked member 32 secured to the push-rod 8. The other arm 33 extends upwardly through an opening in the plate 30 and engages an arm 34 pivotally supported at 35 between the two plates 25—30 and carrying at its free end a toothed sector 36. This sector engages a pinion 37 on a spindle 38 which carries a pointer 39 movable over the dial 26. A hairspring 40 engaging the spindle tends to return the pointer to zero position and to maintain the arm 34 in contact with the arm 33 and the arm 31 in contact with the arm 32. Stops 42 limit the movements of the arm 34.

In the operation of the gauge an upward movement (due to an increase in the pressure in the compartment 14) of the push-rod 8 and arm 32 causes, by reason of the engagement of the arm 32 with the arm 31, a rocking movement of the rod 27 which is transmitted by the arm 33 to the arm 34, causing the arm 34 partially to rotate about its pivotal support 35. This movement of the arm 34 rotates the spindle 38 and causes the pointer 39 to move over the dial to a position corresponding to the increase in pressure in the compartment 14. As soon as the pressure falls and the push-rod 8 moves downwardly, the spring 40 moves the pointer and associated parts to the position corresponding to the new pressure.

The instrument movement has been shown and described in relation to the form of the gauge shown in Figures 2–4; it may however equally well be employed in the form of the gauge shown in Figure 1.

The gauge is held in the casing 41 (Figure 2) by means of the nut 43 on the nipple 6 which passes through a hole in the bottom of the casing. There is no need to make the instrument casing airtight and indeed it is preferred to have it open to atmosphere by one or more passages drilled in its side.

In some known forms of boost gauge the pressure fluid from the induction pipe is taken directly into the interior of the instrument casing and it is a disadvantage of such constructions that petrol vapour has access to the moving parts of the instrument and to the dial and in time has a deleterious effect thereon. With the construction provided by this invention the foregoing disadvantages are removed, because the pressure fluid is confined to the front compartment of the fluid-pressure chamber and does not have access to that portion of the instrument case enclosing the movement and dial. It is a further advantage of the invention that the instrument is entirely independent of case leakage and as already indicated there is no necessity to provide a hermetically sealed case.

I claim:

1. A pressure gauge comprising a fluid-pressure chamber, a flexible operating diaphragm dividing the chamber into two separate compartments one of which may be put into airtight communication with the source of pressure to be measured and the other of which is hermetically sealed, an instrument movement for indicating movements of the operating diaphragm and external to the fluid-pressure chamber, a mechanical coupling between the operating diaphragm and the instrument movement passing through an aperture in a wall of the fluid-pressure chamber to convey, by its movements, the movements of the operating diaphragm to the instrument movement, said apertured wall including a secondary flexible diaphragm attached to the mechanical coupling for movement therewith by flexing of the diaphragm and forming an airtight sealed closure for the aperture aforesaid and means for counteracting the effect on the accuracy of the gauge of changes in atmospheric pressure on the secondary diaphragm, comprising a third flexible diaphragm forming part of said apertured wall and on which the instrument movement is mounted, the third diaphragm being exposed to the same changes in atmospheric pressure as is the sealing diaphragm that the pressure effects on the movement carrying diaphragm and the sealing diaphragm substantially counterbalance each other in their effect on the indications of the instrument movement.

2. A pressure gauge comprising a fluid-pressure chamber, a flexible operating diaphragm dividing the chamber into two separate compartments one of which may be put into airtight communication with the source of pressure to be measured and the other of which is hermetically sealed, an instrument movement for indicating movements of the operating diaphragm and external to the fluid-pressure chamber, a mechanical coupling between the operating diaphragm and the instrument movement passing through an aperture in a wall of the fluid-pressure chamber to convey, by its movements, the movements of the operating diaphragm to the instrument movement, the apertured wall including a secondary flexible diaphragm attached to the mechanical coupling for movement therewith by flexing of the diaphragm and forming an airtight seal at the aperture aforesaid and means for counteracting the effect on the accuracy of the gauge of changes in atmospheric pressure on the secondary diaphragm, comprising a further flexible diaphragm which is parallel to the main diaphragm and external to the fluid-pressure chamber, which is in the form of an annular ring surrounding the sealing diaphragm, which forms with the walls of the pressure chamber a third, sealed, compartment and which carries the instrument movement, the diaphragm being arranged to be subjected to the same changes in atmospheric pressure as is the sealing diaphragm and being so dimensioned and arranged that the pressure effects on the movement carrying diaphragm and the sealing diaphragm substantially counterbalance each other in their effect on the indications of the instrument movement.

3. A boost gauge comprising a fluid-pressure chamber, a flexible operating diaphragm dividing the chamber into front and back compartments of which the front compartment is sealed and the back compartment may be put into communication with the source of pressure to be measured, an instrument movement for indicating movements of the diaphragm and external to the fluid-pressure chamber, a mechanical push-rod coupling between the operating diaphragm and the instrument movement passing through an aperture in the outer wall of the front compartment to convey, by axial movements of the rod, the movements of the operating diaphragm to the instrument movement, the apertured outer wall of the front compartment including a flexible sealing diaphragm attached to the coupling rod for movement therewith by flexing of the diaphragm and forming an airtight seal at the aperture aforesaid, a further flexible diaphragm parallel to the operating diaphragm and forming part of the outer wall of the front compartment and on which the instrument movement is mounted, the movement carrying diaphragm being so arranged that the pressure effects due to changes in atmospheric pressure on the diaphragm tend to counterbalance the effect on the indications of the instrument movement of changes in atmospheric pressure on the sealing diaphragm.

4. A pressure gauge comprising a fluid-pressure chamber of which one wall is formed, at least in part, by two independently supported flexible diaphragms, one surrounding the other, a flexible operating diaphragm parallel to the diaphragms constituting the wall aforesaid and dividing the chamber into front and back compartments of which one is sealed and the other may be put into airtight communication with the source of pressure to be measured, an instrument movement supported from the outer of the two diaphragms constituting the chamber wall and a mechanical coupling extending from the operating diaphragm to the instrument movement through the inner of the two diaphragms forming the wall aforesaid, the arrangement being such that the pressure effects on the inner and outer diaphragms due to changes in atmospheric pressure tend to counterbalance each other in their effect on the indications of the instrument movement.

5. A pressure-responsive diaphragm assembly comprising a fluid pressure chamber of which one wall is formed, at least in part, by two flexible diaphragms one surrounding the other, a flexible operating diaphragm parallel to the diaphragms constituting the wall aforesaid and dividing the chamber into two compartments of which one is sealed and the other may be put in communication with the source of pressure to which the assembly is to be responsive, a transmitting movement supported from the outer of the two diaphragms constituting the chamber wall, and a coupling extending from the operating diaphragm to the transmitting movement through the inner of the two diaphragms forming the wall aforesaid, the arrangement being such that the pressure effects on the inner and outer diaphragms due to changes in atmospheric pressure tend to counterbalance each other in their effect on the action of the transmitting movement.

6. A pressure gauge comprising a main fluid-pressure chamber, a flexible operating diaphragm dividing the main chamber into two separate compartments, one of which may be put into airtight communication with the source of pressure to be measured and the other of which is hermetically sealed, an instrument movement for indicating movements of the operating diaphragm and external to the fluid-pressure chamber, a mechanical coupling between the operating diaphragm and the instrument movement passing through an aperture in a wall of the main fluid-pressure chamber to convey, by its movements, the movements of the operating diaphragm to the instrument movement, the apertured wall including a secondary flexible diaphragm attached to the mechanical coupling for movement therewith by flexing of the diaphragm and forming an air-tight seal at the aperture aforesaid and means for counteracting the effect on the accuracy of the gauge of changes in atmospheric pressure on the secondary diaphragm, comprising an auxiliary hermetically sealed fluid-pressure chamber whereof the walls include a flexible diaphragm which carries the instrument movement and is exposed to the same changes in atmospheric pressure as is the sealing diaphragm, the movement-carrying diaphragm being so dimensioned and arranged that the pressure effects on it and on the sealing diaphragm substantially counterbalance each other in their effect on the indications of the instrument movement.

7. A pressure gauge as claimed in claim 6, in which the auxiliary fluid-pressure chamber is sealed at the same pressure as the hermetically sealed compartment of the main fluid-pressure chamber.

8. A pressure gauge as claimed in claim 6, in which the auxiliary fluid pressure chamber and the hermetically sealed compartment of the main fluid-pressure chamber are in communication, the two virtually constituting a single hermetically sealed enclosure.

FREDERICK MACK.